United States Patent [19]

Oshikawa

[11] Patent Number: 4,792,185
[45] Date of Patent: Dec. 20, 1988

[54] SEAT DEVICE
[75] Inventor: Yoshitoshi Oshikawa, Ayase, Japan
[73] Assignee: Ikeda Bussan Co., Ayase, Japan
[21] Appl. No.: 60,145
[22] Filed: Jun. 10, 1987
[30] Foreign Application Priority Data Jun. 12, 1986 [JP] Japan ................................ 61-136993

[51] Int. Cl.⁴ .............................................. A47C 3/00
[52] U.S. Cl. ................... 297/284; 297/311; 297/337; 297/320; 248/592
[58] Field of Search ............ 297/311, 312, 313, 284, 297/317, 320, 337; 248/592, 593

[56] References Cited

U.S. PATENT DOCUMENTS

| | | | |
|---|---|---|---|
| 2,724,428 | 11/1955 | Sellner | 297/320 |
| 3,337,266 | 8/1967 | Burns | 297/320 |
| 3,359,035 | 12/1967 | Schiffman | 297/317 |
| 3,724,797 | 4/1973 | Freitag et al. | 248/593 |
| 4,124,248 | 11/1978 | Mayer | 297/284 |
| 4,241,894 | 12/1980 | Okuyama | 248/593 |
| 4,636,000 | 1/1987 | Nishino | 297/284 |
| 4,636,002 | 1/1987 | Genjiro | 297/284 |
| 4,673,212 | 6/1987 | Mayer | 297/284 |

Primary Examiner—Francis K. Zugel
Attorney, Agent, or Firm—Foley & Lardner, Schwartz, Jeffery, Schwaab, Mack, Blumenthal & Evans

[57] ABSTRACT

A seat device having a cushion supported to be movable up and down to damp vibration, characterized in that the seated portion of the cushion is divided into front, center and rear parts which are connected bendably with one another, that one of the front and rear parts of the seated portion is pivoted on a fixed member while the other is swingably and slidably supported by a fixed member, that swinging arms are projected downward from the front and rear parts of the seated portion, and that a cushion spring for urging the center part of the seated portion upward is stretched between the front ends of the swinging arms.

5 Claims, 2 Drawing Sheets

SEAT DEVICE

BACKGROUND OF THE INVENTION

1. Field of the Invention

The present invention relates to a seat device for supporting the cushion movable up and down to damp vibration.

2. Prior Art

When a seat is provided subject to vibration, it is well known that the cushion of this seat is supported movable up and down by a suspension means to damp the vibration.

It is common to the conventional techniques in this case that the whole of the cushion is supported elastically movable up and down, that the elastic force of an elastic member is balanced with the weight of a person seated and of the seat, and that the cushion is deformed when vibration is added.

In the case of this conventional seat device, however, most of the seat weight must be received by the elastic member. When the seat is installed in a small space, therefore, the elastic member used must have a large elastic or spring constant but this elastic member can serve only when vibration is substantially large. When the seat is used in a car, for example, it cannot serve as a truly comfortable seat which can damp even such vibration as caused by seams on the road.

SUMMARY OF THE INVENTION

The present invention is therefore intended to eliminate the above-mentioned drawback.

The object of the present invention is therefore to provide a seat device wherein the cushion is supported by an appropriate elastic force to pertinently damp vibration so as to present a comfortable feeling to the person who is seated on the seat.

The object of the present invention can be achieved by a seat device having a cushion supported movable up and down to damp vibration, characterized in that the seated portion of the cushion is divided to front, center and rear parts which are connected bendably with one another, that one of the front and rear parts of the seated portion is pivoted on a fixed member while the other is swingably and slidably supported by a fixed member, that swinging arms are projected downward from the front and rear parts of the seated portion, and that a cushion spring for urging the center part of the seated portion upward is stretched between the front ends of the swinging arms.

The center part of the seated portion of the cushion is urged upward but the front and rear parts thereof are only swung although they are moved up and down a little.

When the person sits on the cushion, the center part is moved downward a little while the front and rear parts are swung, and they are stopped at such positions as they are balanced with the spring force of the cushion spring. When the condition of load is changed by up and down vibration, the center part of the cushion is moved up and down by the spring force of the cushion spring to damp the vibration.

The cushion spring serves only to receive the center part of the cushion and it may be therefore low in spring constant to effectively damp slight vibration.

According to the seat device of the present invention, only a part of the cushion is moved up and down, causing the cushion spring to damp vibration. Therefore, the load which must be received by the cushion spring can be made small, thereby enabling the cushion spring to have a small spring force. As the result, even slight vibration can be damped to make a person feel comfortable on the seat.

DETAILED DESCRIPTION OF THE PREFERRED EMBODIMENT

An embodiment of the present invention will be described with reference to the accompanying drawings.

Figure 2:
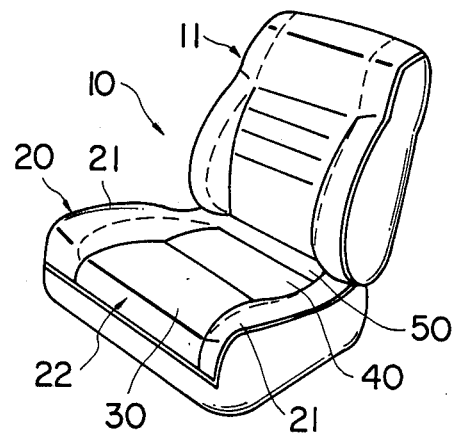
FIG. 2 is a perspective view showing a seat.

As shown in FIG. 2, a seat 10 comprises a cushion 20 and a seat back 11 erected from the rear end of the cushion 20. The cushion 20 comprises a seated portion 22 which is triple-divided to front, center and rear parts 30, 40 and 50 between side portions 21.

Figure 1:
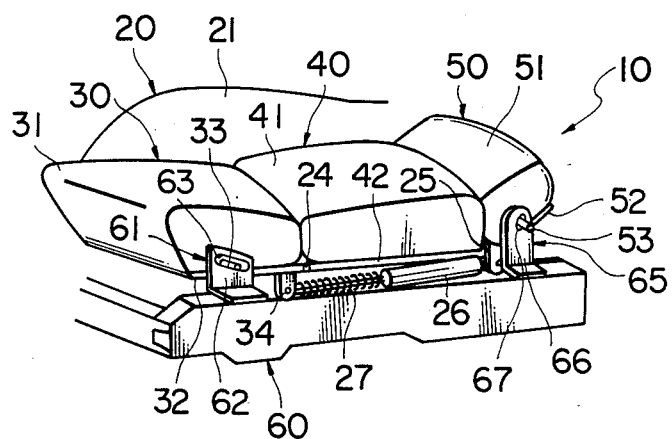
FIG. 1 is a perspective view showing main portions of a seat device.
Figure 3:
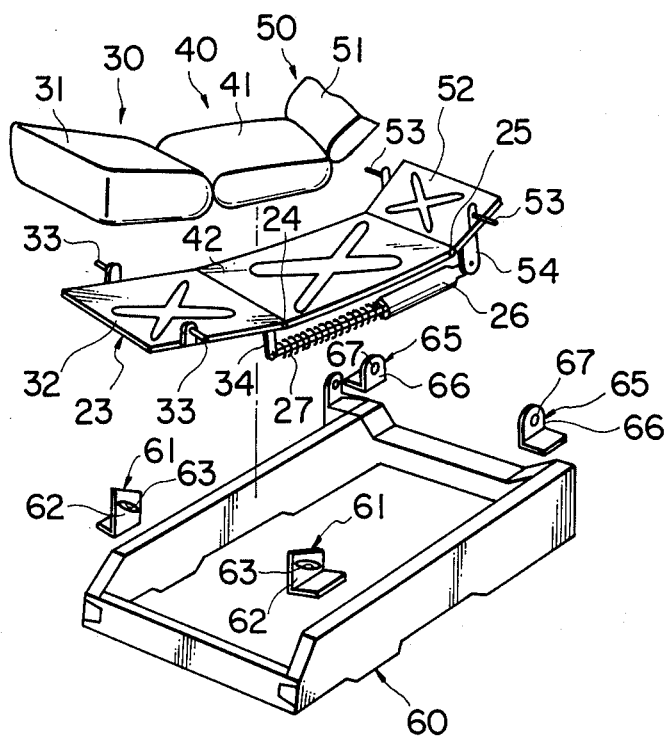
FIG. 3 is a perspective view showing the seat device developed.
Figure 4:
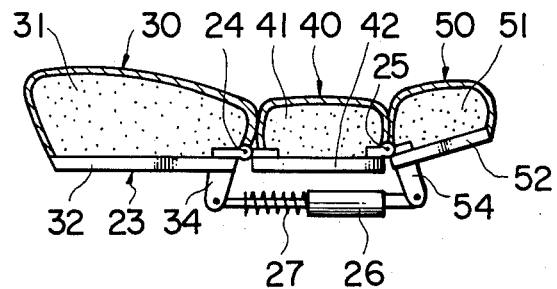
FIG. 4 is a sectional view taken along the longitudinal direction of the seat device.

As seen in FIGS. 1, 3 and 4, the front part 30 includes a front pad 31 and a front frame 32 for supporting the front pad 31, the center part 40 includes a center pad 41 and a center frame 42 for supporting the center pad 41, and the rear part 50 includes a rear pad 51 and a rear frame 52 for supporting the rear pad 51. The front, center and rear frames 32, 42 and 52 form a cushion frame 23, which is supported by a seat base 60.

The front and center frames 32 and 42 are bendably connected with each other through a hinge 24, while the center and rear frames 42 and 52 are also bendably connected with each other through a hinge 25.

Supported pins 33 are projected sideward from both sides of the front frame 32 through fixed brackets, and pivoted pins 53 are also projected sideward from both sides of the rear frame 52 through fixed brackets. Swinging arms 34 are projected downward from both sides of the front frame 32 while swinging arms 54 are also projected downward from both sides of the rear frame 52.

Support brackets 61 are fixed to both front sides of the seat base 60 while support brackets 65 are also fixed to both rear sides thereof. A support slot which is slanted downward from front to rear is provided in a vertical wall 62 of each of the support brackets 61, and a pivot hole 67 is provided in a verticle wall 66 of each of the support brackets 65.

The supported pins 33 of the front frame 32 are rotatably and slidably fitted into the support slots 63 in the support brackets 61 on the seat base 60, and pivoted pins 53 of the rear frame 52 are rotatably fitted into the pivot holes 67 in the support brackets 65.

A combination of a damper 26 and a cushion spring 27 is provided between the front ends of the swinging arms 34 and 54 of the front and rear frames 32 and 52. The cushion spring 27 serves as a tension spring, pulling the swinging arms 34 and 54 of the front and rear frames 32 and 52 toward each other to thereby urge the center part 40 upward.

When no person is seated on the cushion 20, the center part 40 of the seated portion is raised to its highest position and the supported pins 33 of the front part 30 are positioned at the front upper ends of the support slots 63 in the support brackets 61, stopping at the stroke end of the damper 26 or contacting the front upper ends of the support slots 63.

When someone is seated on the cushion 20, the center part 40 is most weighted and thus lowered. When the center part 40 is lowered, the hinges 24 and 25 at front and rear ends of the center part 40 are also lowered, causing the front and rear parts 30 and 50 to be bent from the center part 30. This causes the front ends of the swinging arms 34 and 54 of the front and rear frames 32 and 52 to be spread from each other against the urging force of the cushion spring 27 and stopped at a position where the urging force is balanced with the weight of the person seated.

When the front ends of the swinging arms 34 and 54 are thus stopped, the supported pins 33 of the front part 30 are positioned in the center of the support slots 63 in the support brackets 61 and, taking this state as a neutral point, the center part 40 is moved up and down by vibration.

When a load to lower the center part 40 is added because of vibration, the urging force of the cushion spring 27 acts to stop and damp it. When vibration is added to raise the center part 40, the cushion spring 27 follows the rising of the center part 40 to damp the vibration. The damper 26 controls its damping effect according to the acceleration of vibration and it may be of the unilateral or bilateral type.

Although the supported pins 33 of the front part 30 of the cushion 20 are rotatably and slidably supported by the support slots 63 in the case of the above-described embodiment, the pivoted pins 53 of the rear part 50 may be rotatably and slidably supported instead. Only the cushion spring 27 may be stretched between the front ends of the swinging arms 34 and 54 of the front and rear frames 32 and 52 without using the damper 26.

Although the seated portion 22 is triple-divided to the front, center and rear parts 30, 40 and 50 in the case of the above-described embodiment, it may be divided to four or more parts.

Although the present invention has been described with reference to the preferred embodiment thereof, it should be understood that various changes and modifications can be made without departing from the scope and spirit of the present invention.

I claim:

1. A seat device comprising:
   a seat base;
   a seat divided into front, center and rear parts swingably connected with one another;
   first and second pairs of support members attached to the seat base;
   paired swing arms projected downward from each of the front and rear parts; and
   spring means stretched between the swing arms of the front and rear parts to urge the center part of the seat upward from said base, wherein;
   one of the front and rear parts of the seat is pivoted on the first pair of support members and the other thereof is swingably and slidably attached to the second pair of support members, so that the seat can be moved up and down to damp vibration.

2. A seat device according to claim 1, wherein the seat parts comprise front, center and rear frames hinged with one another and front, center and rear pads mounted on their respective frames.

3. A seat device according to claim 1, wherein the first pair of support members are each provided with a hole formed therein for pivotably supporting a shaft, and the second pair thereof are each provided with an inclined slot for swingably and slidably supporting another shaft.

4. A seat device according to claim 1, wherein the spring member is connected to a damper.

5. A seat device comprising:
   a seat base;
   front, center and rear frame means pivotally interconnected and mounted on said base for up and down movement of said center frame means relative to said base;
   a first and second pair of support members attached to and extending from said base;
   a first and second pair of swing arms attached to and extending from said front and rear frame means, respectively;
   means for slidably and pivotally mounting said first and second pair of support members with said first and second pair of swing arms; and
   damper means and tension means connected between said first and second pair of swing arms for urging said center frame means upwardly relative to said base.

* * * * *